Jan. 22, 1924.

A. CASPER

METER BOX

Filed Sept. 13, 1921

INVENTOR
ALBERT CASPER.

BY Chas. E. Townsend

ATTORNEY

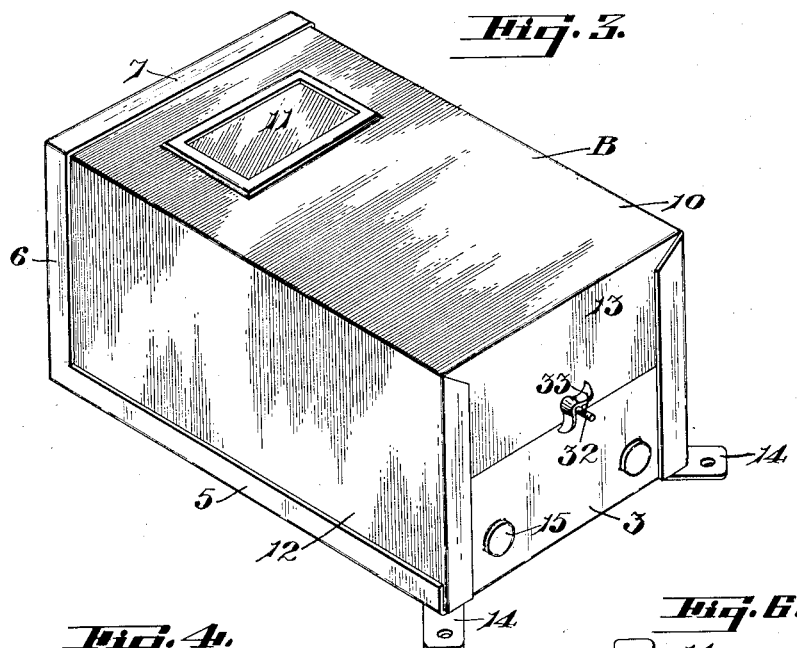
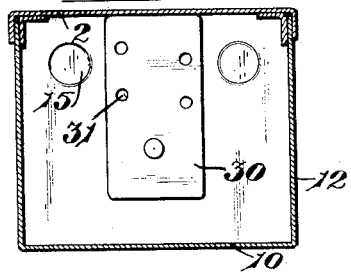
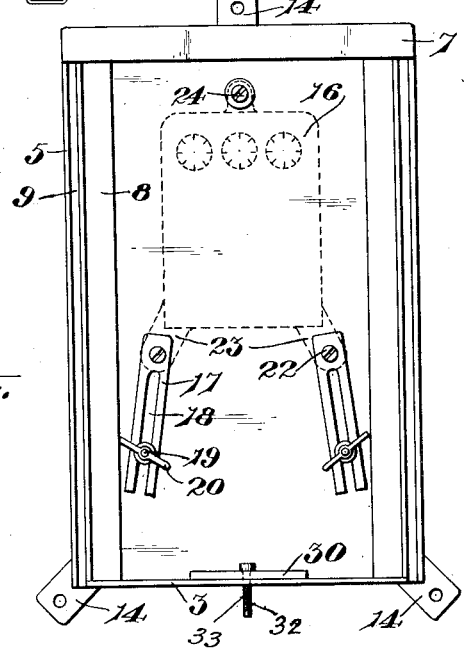
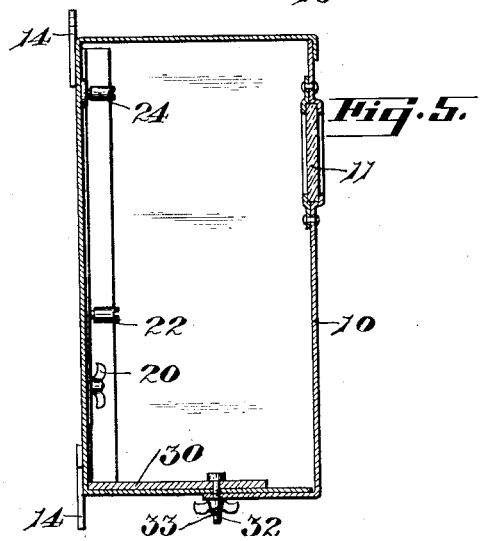

Patented Jan. 22, 1924.

1,481,415

UNITED STATES PATENT OFFICE.

ALBERT CASPER, OF VALLEJO, CALIFORNIA.

METER BOX.

Application filed September 13, 1921. Serial No. 500,470.

*To all whom it may concern:*

Be it known that I, ALBERT CASPER, a citizen of the United States, residing at Vallejo, in the county of Solano and State of California, have invented new and useful Improvements in Meter Boxes, of which the following is a specification.

This invention relates to a meter box, and especially to that type of boxes which are provided for the purpose of supporting and inclosing watt hour meters and like devices employed in electric lighting circuits, etc.

One of the objects of the present invention is to provide a simple, substantial, cheaply maufactured, and easily assembled box of the character described by which a watt hour meter, with connected fuse blocks, etc., may be supported and inclosed; further to provide a box which may be installed on the outside of a building, or in any other convenient place, where the meter will be accessible at all times for reading, inspection, testing, repairs, etc.

Another object of the invention is to provide a box which will so completely inclose the meter, etc., that it will be protected against rain, moisture, and other damage, and which is provided with a seal or lock which will prevent theft of current, tampering, etc.

Another object of the invention is to provide a removable front section, together with means for supporting said section when in place and locking it against removal.

Another object of the invention is to provide an adjustable support within the box for the support of the watt hour meter.

Further objects will hereinafter appear.

The invention consists of the parts and the construction, combination and arrangement of parts as hereinafter more fully described and claimed, having reference to the accompanying drawings, in which—

Fig. 3 is a perspective view showing the meter box assembled and closed.

Fig. 4 is a plan view in cross-section of the meter box.

Fig. 5 is a central, vertical, longitudinal section of the meter box.

Fig. 6 is a front view of the meter box showing the front or cover section removed.

Figure 1:
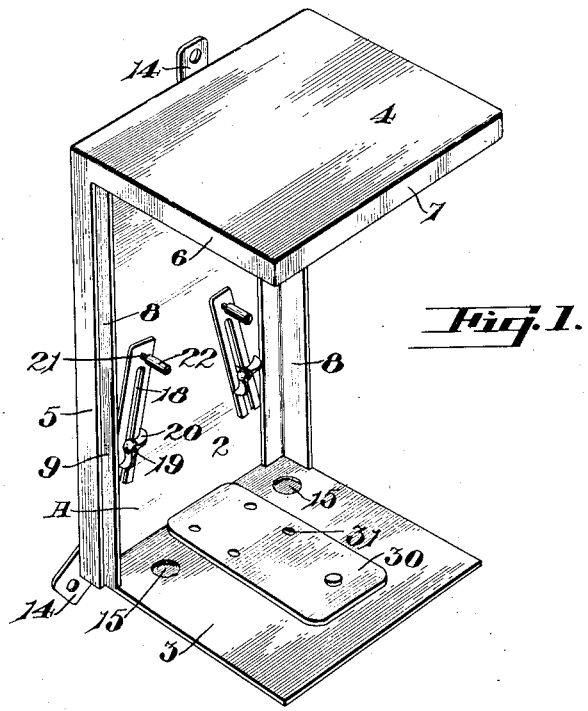
Fig. 1 is a perspective view of the rear half of the meter box.
Figure 2:
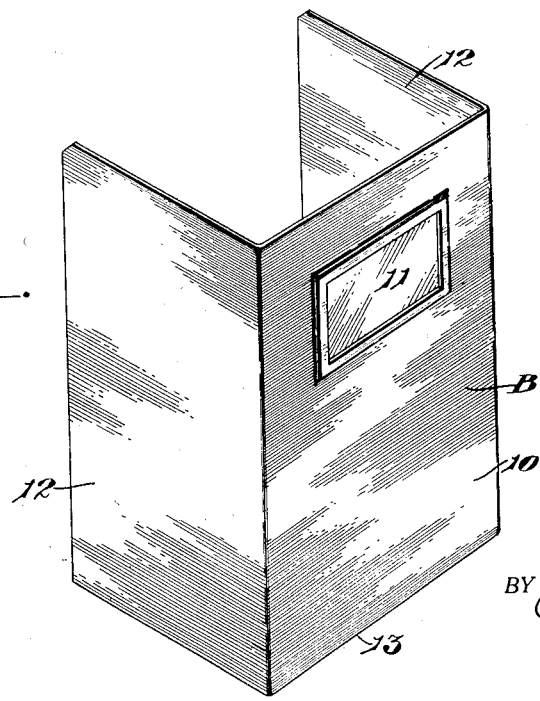
Fig. 2 is a perspective view of the front or cover section of the meter box.

Referring to the drawings in detail, and particularly to Figs. 1 and 2, A indicates in general the rear section of the meter box, and B the front section. The rear section consists of a plate 2, a bottom section 3, and a cover section 4. The sides of the plate 2 are bent forward to form guide flanges 5 and the cover section 4 is similarly flanged on the sides and the front as at 6 and 7, respectively, to overlap the front section B when this is placed in position. Secured to the inner face of the plate 2 is a pair of angle bars 8. These bars extend from the top to the bottom of the plate 2, and they are interspaced with relation to the side flanges 5 to form a pair of channels 9 into which the sides of the cover section extend when in position.

The front or cover section, generally indicated at B, consists of a front plate 10 in which is formed a window 11, a pair of side plates 12 and a partial bottom section 13. The rear section, together with the front section, may be constructed of sheet metal or like material. They may be formed as integral parts, if desired, or the several sections comprising each part may be riveted, spotwelded or otherwise assembled. The rear section may be secured to a wall, post or other suitable support by means of projecting perforated lugs generally indicated at 14. The incoming and outgoing cables for the watt hour meter, fuses, etc., contained within the meter box, will enter the box through knockouts or the like, indicated at 15. These are preferably formed in the bottom section 3 to prevent admission of rain, dust, etc., and particularly when the meter box is placed on the exterior of a building or the like.

For the purpose of providing a convenient support, interior of the box section A, for the reception of a watt hour meter, indicated by dotted lines at 16, (see Figs. 1 and 6,) I provide a pair of adjustable legs 17. These legs are in reality nothing more or less than elongated flat bars, which are slotted as at 18, to permit them to straddle a screw 19. This screw is provided with a lock nut or thumb screw 20 and this screw forms the function of securing the bars when adjusted. The thumb screw forms a sliding and a pivotal support for each bar and will thus take care of watt hour meters regardless of size, width and length. Secured on the upper end of each bar is a stud screw and cooperating therewith is a cap screw 22.

Most watt hour meters, such as indicated at 16, are provided with three perforated projecting lugs such as shown at 23; there being one at the top and two at the bottom. The screws 21 of the respective bars 17 are passed through the lugs 23 and the cap screws 22 are then applied. The watt hour meter is next placed within the box and an upper screw 24 is applied. The bars 17 are then swung about the screws 21 until they straddle the screws 19, when they are locked in position by applying the thumb screws 20 and tightening the same. This method of attaching and supporting the watt hour meter is exceedingly convenient as it permits varying forms and sizes to be installed without in any way altering the interior, and particularly the supporting means within the meter box.

Attached to the bottom section 3 of the rear section A of the meter box is a plate 30. This is riveted or otherwise secured in place, and it is provided with a number of tapped holes at varying points, as indicated at 31, to receive fuse blocks of varying size, and it may for this reason be termed an adjustable support for the reception of fuse blocks.

In actual operation with the rear section A secured to a suitable support and the front section B removed, it is obvious that a watt hour meter may be readily inserted; also fuse blocks regardless of their size, and that the connecting wires may be inserted and connected through the knockout openings 15. With the several parts inserted and connected, it will only be necessary to apply the front section B. This is accomplished by inserting the side sections 12 in the channels 9 by pushing the front section until the sides bottom in the channels. The front section is then moved upwardly a slight distance until the upper ends of the side sections 12 and the front section 10 engage with the lower side of the cover section 4. This upward movement insures overlapping of the flanges 6 and 7 of the cover 4 with relation to the front and side sections 10 and 11, and thus forms a weatherproof joint at this point between the front and the rear section of the meter. Bottoming of the side sections 12 in the channels 9 insures a weatherproof joint along each side and as the side sections 12 overlap the bottom section 3, a similar joint is formed at this place, thus insuring exclusion of dust, rain, moisture, etc. In order to lock the front section B when thus positioned, a stud screw 32 has been provided. This screw secures the plate 30 to the bottom section 3 and it projects below the bottom section a sufficient distance to pass through a perforation formed in the bottom section 13. A thumb screw is then applied and separation of the front and rear section is prevented. The threaded extension of the bolts 32 is so long that a perforation 33 may be formed therein. A lock may be passed through this perforation in the bolt or a wire with a lead seal may be applied, thus locking the sections together and preventing theft of current or tampering with the mechanism.

From the foregoing it can be seen that the meter with connected mechanism is amply protected both against wind, rain and weather; current theft or tampering is prevented and the meter and connected parts are otherwise protected against damage from exterior sources, whether malicious or otherwise as they are perfectly inclosed within the box. The entire inclosure is simple and substantial in construction and may be readily assembled or taken apart by authorized persons when required; and while certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. A meter box comprising a rectangular shaped box vertically divided to form separable front and rear sections, said front section comprising a front plate, integral side plates and a bottom flange, said rear section comprising a rear plate, a bottom plate and a cover plate, downwardly extending flanges on the front and sides of the cover plate adapted to overlap the front and side plates of the front section, two pairs of interspaced flanges on the rear plate forming channels for the reception of the front edges of the side plates of the front section, and means for locking the front section against vertical movement with relation to the rear section.

2. A meter box comprising a rectangularly shaped box vertically divided to form separable front and rear sections, said front section comprising a front plate, integral side plates and a bottom flange, said rear section comprising a rear plate, a bottom plate and a cover plate, downwardly extending flanges on the front and sides of the cover plate adapted to overlap the front and side plates of the front section, two pairs of interspaced flanges on the rear plate forming channels for the reception of the front edges of the side plates of the front section, means for locking the front section against vertical movement with relation to the rear section, said means comprising a bolt secured in the bottom of the rear section, a perforation in the bottom flange of the front section through which said bolt passes, a nut on said bolt, and a perforation formed in the bolt for the reception of locking means.

3. A meter box comprising a rectangularly shaped box vertically divided to form separable front and rear sections, said front section comprising a front plate, integral side plates and a bottom flange, said rear section comprising a rear plate, a flange and an angle bar on each side of the rear plate forming channels for the reception of the sides of the front section, a flange cover member on the rear plate forming a rainproof joint and a cover for the sides and front plate of the front section, a bottom section on the rear plate and locking means carried by said bottom section and the bottom flange on the front section.

ALBERT CASPER.